No. 829,405.
PATENTED AUG. 28, 1906.
L. E. KNOTT.
LINEAR EXPANSION APPARATUS.
APPLICATION FILED FEB. 1, 1906.
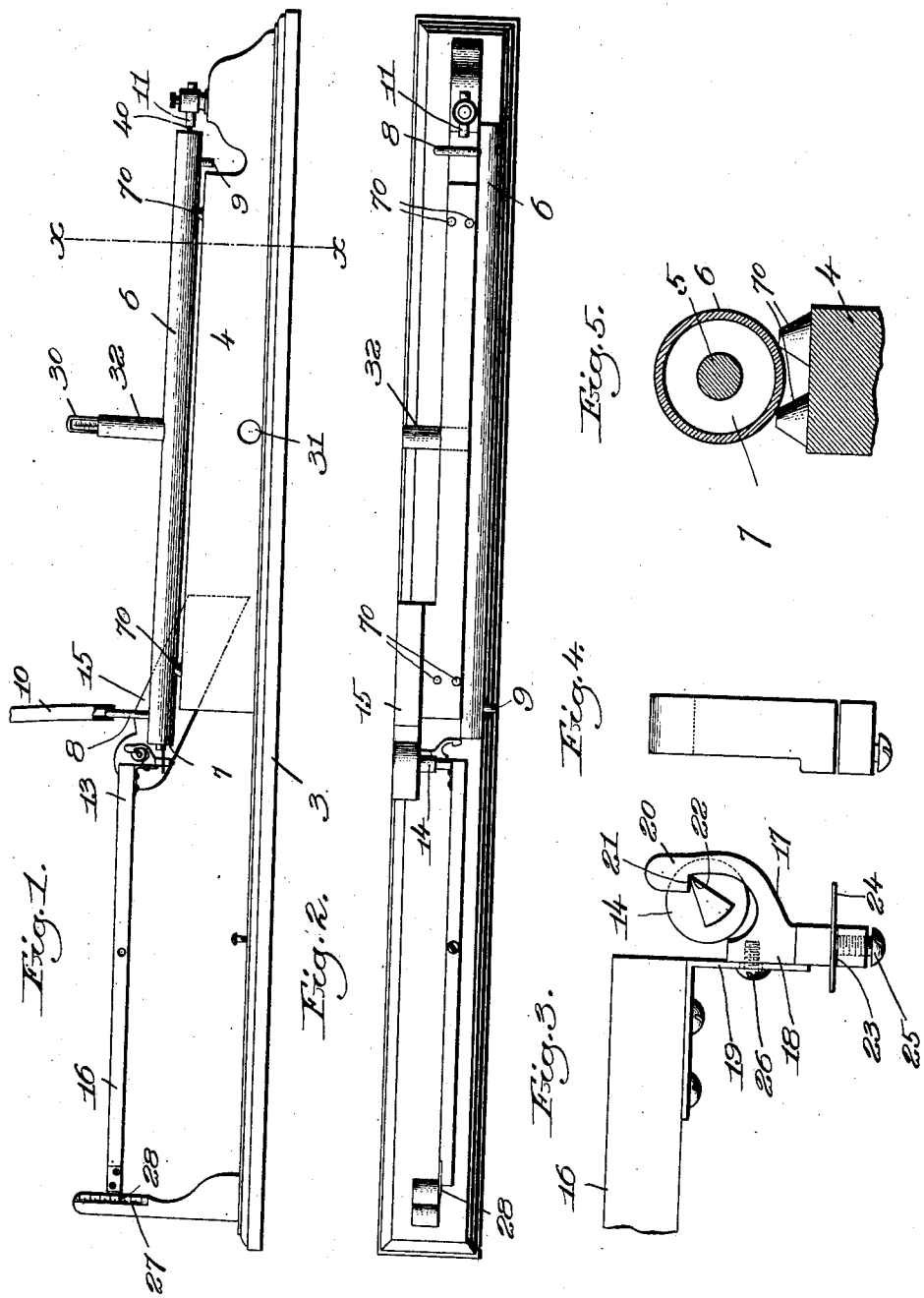

UNITED STATES PATENT OFFICE.

LOUIE E. KNOTT, OF BOSTON, MASSACHUSETTS.

LINEAR-EXPANSION APPARATUS.

No. 829,405.  Specification of Letters Patent.  Patented Aug. 28, 1906.

Application filed February 1, 1906. Serial No. 299,050.

*To all whom it may concern:*

Be it known that I, LOUIE E. KNOTT, a citizen of the United States, residing at Boston, county of Suffolk, and State of Massachusetts, have invented an Improvement in Linear-Expansion Apparatus, of which the following description, in connection with the accompanying drawings, is a specification, like numerals on the drawings representing like parts.

This invention relates to linear-expansion apparatus, and has for its object to provide a simple and inexpensive apparatus of this character by which the amount of linear expansion and coefficient of expansion of a given bar may be accurately measured and determined.

A device embodying my invention comprises a fulcrumed measuring member provided with a long indicating-arm which plays over a scale and by which the amount of expansion is indicated and a short arm to engage one end of the bar which is measured.

The invention relates principally to the construction of the short arm, whereby it may be readily and accurately adjusted and the ratio between the length thereof and the long arm may be accurately and easily measured by the person performing the experiment.

A construction embodying my invention will first be described and then the novel features of the invention will be pointed out in the claims.

In the drawings, Figure 1 is a side view of the linear-expansion apparatus embodying my invention. Fig. 2 is a top plan view showing the parts of the apparatus packed on the base ready for shipment. Fig. 3 is an enlarged view showing the manner in which the measuring-arm is fulcrumed on the fulcrum member. Fig. 4 is a side view of the short arm of the measuring member detached; and Fig. 5 is a section, on an enlarged scale, on the line *x x*, Fig. 1.

3 designates a suitable base on which the apparatus is supported, and 4 a support at one end of the base on which the bar 5, the expansion of which is to be measured, is supported. The bar 5 is shown as inclosed within a tubular casing 6 and as projecting at each end through the head 7 of the casing, said bar being supported by the heads. The casing 6 is held in proper position by means of two pairs of rests 70, situated at either end of the support 4. The casing 6 has an inlet 8, through which a heating medium from the conduit 10 may be introduced into the casing. Said casing has also an outlet 9 for the discharge of the heating medium and a thermometer-tube 32, in which a thermometer 30 may be placed for giving the temperature of the interior of the casing, and consequently of the bar therein.

One end 40 of the bar 5 is adapted to butt against an abutment 11, carried by the support 4, and the other end 12 of said bar is adapted to engage the short arm of the indicating member 13. This indicating member is fulcrumed on a fulcrum member 14, which projects from an arm 15, extending from the support 4. Said indicating member has a long horizontal measuring-arm 16 and a short arm 17, which abuts against the end of the rod 5, as stated above, said short arm having an angular relation to the long arm.

In order to accurately determine the amount which the rod 5 expands when raised to a certain degree of temperature, it is necessary to know the exact distance between the fulcrum-point of the fulcrum member and the end of the long arm 16 and also the exact distance between said fulcrum-point and the point where the short arm 17 engages the bar 5. In order to provide for readily and accurately measuring these distances, I make the short arm 17 of the shape best shown in Fig. 3, it having a body portion 18, which is secured to a foot 19, extending laterally from the end of the arm 16, and an upwardly and laterally projecting portion 20, provided with a seat 21, which rests on the knife-edge 22 of the fulcrum member, said seat being in line with the arm 16, but spaced from the end thereof. The short arm 17 is provided with a laterally-extending slot 23, in which a plate or toe 24 is adjustably secured by means of a suitable set-screw 25, said plate or toe constituting the part of the short arm which engages the end of the bar 5. The short arm 17 is made separate from the long arm 16 and is adjustably secured thereto by means of a suitable set-screw 26. The shape of the short arm is such that the distance between the seat 21 and the edge of the toe 24 can be readily measured by means of an ordinary steel scale and also the distance between said seat and the free end of the long arm 16 as readily and accurately measured.

In order that the measurement indicated by the movement of the arm 16 over the scale 27 may accurately give the expansion, it is desirable that the line between the end of the toe 24 and the corner of the seat 21 be at exactly right angles to the line between the pointer 28 at the end of the arm 16 and said seat. By making the short arm 17 adjustable on the foot 19 and the toe 24 adjustable on the short arm this right-angular relation between these lines may be readily secured.

In using my improved apparatus the operator first adjusts the arm 17 and the toe 24, so as to secure the above-described right-angular relation between the arms of the measuring member, and then measures accurately the length of each arm. The measuring member is then placed on the fulcrum, as shown in the drawings, with the toe 24 engaging the end of the bar 5, and the temperature of the bar as given by the thermometer 30 and the reading on the scale 27 are carefully noted. The temperature of the bar is then increased to any desired point by the introduction of a heating medium. When the desired point is reached, the position of the pointer 28 on the scale 27 is again noted. From these data the amount which the bar 5 has expanded and also the coefficient of expansion can be determined by well-known formulas.

In packing the instrument for transportation the measuring member 13 is removed from the fulcrum member and screwed to the base, as shown in Fig. 2, and the casing 6, with the bar 5 therein, is laid on the base with the thermometer-tube 32 extending through an aperture 31 in the support, as seen in Fig. 2.

Having fully described my invention, what I claim as new, and desire to secure by Letters Patent, is—

1. In a linear-expansion apparatus, a fulcrum member, a measuring member having an indicating-arm and a short arm standing at an angle to each other, said short arm having a seat to rest on the fulcrum member, which seat is situated beyond the terminus of the long arm and in the direction of the length thereof.

2. In a linear-expansion apparatus, a fulcrum member, a measuring member having a seat to rest on the fulcrum member and also having both an indicating-arm and a short arm to engage the bar concerning which the measurement is to be made, said arms extending in different directions from the seat and said seat being situated beyond the terminus of the indicating-arm and in the direction of the length thereof.

3. In a linear-expansion apparatus, a fulcrum member, a measuring member pivoted thereon, said measuring member having a long horizontal indicating-arm and a vertical arm provided with a toe to engage the bar to be measured, said toe being adjustable both longitudinally and laterally of the long indicating-arm.

4. In a linear-expansion apparatus, a fulcrum member, a measuring member pivoted thereon, said measuring member having a long indicating-arm and a short arm having an angular relation to the indicating-arm and a plate adjustably mounted in the short arm and adapted to engage the bar concerning which the measurement is to be made.

5. In a linear-expansion apparatus, a fulcrum member, a measuring member fulcrumed thereon, said measuring member having a long indicating-arm and a short arm adjustable transversely of the long arm, and a plate adjustably mounted in the short arm and adapted to engage the bar concerning which the measurement is to be made.

6. In a linear-expansion apparatus, a fulcrum member, a measuring member pivoted thereon, said measuring member having a long indicating-arm to move over a scale and a short arm detachable from the long arm and adapted to engage the bar concerning which the measurement is to be made.

7. In a linear-expansion apparatus, a fulcrum member, a measuring member pivoted thereon, said measuring member having a long indicating-arm to move over a scale and a short arm detachable from the long arm, and a toe adjustably mounted on the short arm and adapted to engage the bar concerning which the measurement is to be made.

8. In a linear-expansion apparatus, a fulcrum member, a measuring member pivoted thereon, said measuring member having a long indicating-arm and a short arm adjustable with relation to the long arm and provided with a fulcrum-seat which rests on the fulcrum member, said short arm engaging the bar concerning which the measurement is to be made.

9. In a linear-expansion apparatus, a fulcrum member, a measuring member pivoted thereon, said measuring member having a long indicating-arm and a short arm adjustable with relation to the long arm and provided with a fulcrum-seat which rests on the fulcrum member, said short arm having an adjustable toe and adapted to engage the bar concerning which the measurement is to be made.

10. In a linear-expansion apparatus, a fulcrum member and a measuring member, said measuring member having a long indicating-arm and a short arm adjustable laterally of the long arm, said short arm being provided with a seat to rest on the fulcrum member, said seat being spaced from the end of the indicating-arm.

In testimony whereof I have signed my name to this specification in the presence of two subscribing witnesses.

LOUIE E. KNOTT.

Witnesses:
   LOUIS C. SMITH,
   MARGARET A. DUNN.